(12) United States Patent
Weis

(10) Patent No.: US 7,263,909 B2
(45) Date of Patent: Sep. 4, 2007

(54) DRIVE DEVICE

(75) Inventor: Christian Weis, Mainz (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/718,649

(22) Filed: Nov. 24, 2003

(65) Prior Publication Data
US 2004/0099077 A1    May 27, 2004

Related U.S. Application Data

(63) Continuation of application No. PCT/DE02/01821, filed on May 21, 2002.

(30) Foreign Application Priority Data
May 23, 2001    (DE) ............................... 101 25 093

(51) Int. Cl.
*F16H 1/16* (2006.01)

(52) U.S. Cl. .................... 74/425; 74/411; 74/443; 292/201

(58) Field of Classification Search ............ 74/53, 74/54, 55, 89.14, 405, 411, 443, 446, 391, 74/425; 292/201
See application file for complete search history.

(56) References Cited

U.S. PATENT DOCUMENTS

| | | | | |
|---|---|---|---|---|
| 2,857,777 A * | 10/1958 | Porter | | 74/432 |
| 3,406,583 A * | 10/1968 | Baier | | 74/411 |
| 3,446,085 A * | 5/1969 | Ginsberg | | 74/89.14 |
| 4,367,660 A * | 1/1983 | Becker et al. | | 74/625 |
| 4,376,630 A * | 3/1983 | Hampel et al. | | 464/88 |
| 4,899,608 A * | 2/1990 | Knappe et al. | | 74/411 |
| 5,649,726 A * | 7/1997 | Rogers et al. | | 292/201 |
| 5,697,237 A * | 12/1997 | Dilger et al. | | 70/264 |
| 6,073,503 A * | 6/2000 | Matsuno et al. | | 74/55 |
| 6,145,354 A * | 11/2000 | Kondo et al. | | 70/279.1 |
| 6,371,536 B1 * | 4/2002 | Koerwer et al. | | 292/201 |
| 6,439,624 B1 * | 8/2002 | Spurr | | 292/201 |
| 6,445,081 B1 * | 9/2002 | Franz | | 307/10.1 |
| 6,557,911 B2 * | 5/2003 | Nelsen et al. | | 292/216 |
| 6,736,022 B2 * | 5/2004 | Chang et al. | | 74/439 |

FOREIGN PATENT DOCUMENTS

DE    34 29 249 A1    2/1986

(Continued)

OTHER PUBLICATIONS

Derwent Abstract, FR 94 07903; Dec. 29, 1995; Vale Systemes D'Essuyage S.A., FR.
Derwent Abstract, EP 0 320 008A3; Jun. 14, 1989; Aug. Winkhaus GmbH & Co.KG; D-4404 Telgte.
Derwent Abstract, DE 197 27 422C1; Jun. 25, 1998; Pierre Meyers and Klaus Meister.

(Continued)

*Primary Examiner*—Richard Ridley
*Assistant Examiner*—Matthew A. Johnson
(74) *Attorney, Agent, or Firm*—Siemens AG

(57) ABSTRACT

The present invention is electronically driven locking device for a locking element of a motor vehicle. The device has a motor, a gear wheel including a gear ring, a hub, and an elastic intermediate element, and a control disk. The motor is linked to the gear ring via a worm gear which is arranged to turn the gear. The control disk is linked to the locking element such that when the gear ring is turned, the hub is turned via the intermediate element which in turn engages the locking element to close or open. The intermediate element is arranged to absorb kinetic energy in the device.

10 Claims, 3 Drawing Sheets

| | FOREIGN PATENT DOCUMENTS | |
|----|----|----|
| DE | 35 10 642 C2 | 2/1990 |
| DE | 92 05 765.9 | 10/1992 |
| DE | 197 27 422 C1 | 6/1998 |
| DE | 19839707 A1 * | 3/2000 |
| EP | 0 320 008 A3 | 6/1989 |
| EP | 0 684 356 A1 | 11/1995 |
| FR | 94 07903 | 12/1995 |

OTHER PUBLICATIONS

Derwent Abstract, DE 35 10 642C2; Feb. 1, 1990; SWFAuto-Electric GmbH, D-7120 Bietigheim-Bissingen.

Derwent Abstract, DE 34 29 249A1; Feb. 20, 1986; Siemens AG, D-1000 Berling and D-8000 München.

Translation of German Utility Model G 92 05 765.9, filed Apr. 29, 1992 and published Oct. 29, 1992.

* cited by examiner

DRIVE DEVICE

The present application is a continuation of International Application PCT/DE02/01821 filed on 21 May, 2002, which designated the United States and further claims priority to German patent 10125093.2, filed 23 May, 2001, the both of which are herein incorporated by reference.

BACKGROUND OF THE INVENTION

The present invention relates to a drive device with an actuating drive for driving a movable element, in particular a locking device of a motor vehicle door, by means of a gear wheel which has a gear ring and a hub, it being possible for the gear ring to be driven directly or indirectly by the actuating drive and for the movable element to be acted on indirectly or directly by the hub of the gear wheel.

Locking devices of motor vehicle doors are usually driven mechanically or electrically. Electrically driven locking devices are used in particular when a particularly rapid opening and/or locking operation of the motor vehicle door is required. A particularly powerful motor which runs up to particularly high revolutions in a particularly short time is required for a particularly rapid opening and/or locking operation of a motor vehicle door. However, as the opening and/or locking operation takes only a particularly short amount of time, the actuating drive which drives the locking device is usually turned off again, that is to say run down, directly after it has been run up. Even if the actuating drive which activates the locking device is immediately switched off, the kinetic energy of the motor can cause a considerable peak torque to be applied to some elements driven by the motor. This loading can damage components of the drive train and, in extreme cases, even destroy them. However, as an electronically driven locking device of a motor vehicle in a motor vehicle door requires an extremely small amount of space, it is usually not possible to absorb the kinetic energy over a particularly long path when turning off the actuating drive which drives the locking device.

SUMMARY OF THE INVENTION

The present invention is therefore based on an object of specifying a drive device of the abovementioned type, which necessitates a particularly small space requirement and in the case of which the kinetic energy of the actuating drive can be reliably absorbed even if the actuating drive is suddenly switched off.

This and other objects are achieved according to the invention in that the gear ring of the gear wheel and the hub of the gear wheel are composed of predominantly rigid material and are joined to one another by a predominantly elastic intermediate element.

The invention proceeds from the consideration that the kinetic energy of an actuating drive can produce a considerable peak torque which should be absorbed in order to reliably avoid mechanical damage to the drive device. The kinetic energy could be absorbed by allowing the motion of the respectively moving components to die away. However, space is required in the housing of the drive device to allow the motion of the moving components to die away. This space cannot be provided, as the drive device is provided for installation in particularly narrow elements such as a motor vehicle door. It should therefore be possible to allow the motion of the moving components of the motor of the drive device to die away not over a kinetic path but using components which are already present in the drive device. If the actuating drive and the movable element are now decoupled, then the excess kinetic energy can be absorbed by means of the decoupling element. However, it should be reliably ensured here that it is still possible to activate the movable element in a particularly reliable way. Elastic material, which is arranged within the drive device between the actuating drive and the movable element, is suitable as decoupling medium. However, it should be possible here to dispense with an additional element within the drive device. For this purpose, the gear ring of the gear wheel and the hub of the gear wheel are joined to one another by a predominantly elastic intermediate element. After the actuating drive has been turned off, the elastic intermediate element swings back into its initial position and in this way absorbs kinetic energy of the drive device still present in said drive device after the actuating drive has operated.

The gear ring of the gear wheel and the hub of the gear wheel are advantageously joined to one another with a material-to-material bond by the elastic intermediate element. In this configuration, the elastic intermediate element is part of the gear wheel. As a result, the drive device has a particularly small overall size. Furthermore, it is possible to dispense with additional fastening means, as the gear ring and the hub of the gear wheel are joined by the elastic intermediate element, for example by means of the two-component technique. All hard/soft combinations which can be joined to one another with a material-to-material bond are suitable for this purpose.

The predominantly rigid material of the gear ring of the gear wheel and of the hub of the gear wheel is advantageously predominantly rigid plastic, the elastic intermediate element being composed of a predominantly elastic plastic. Plastics can be joined to one another with a material-to-material bond in a particularly easy manner, for example chemically, as a result of which the expenditure on manufacture of the drive device is particularly small.

The hub of the gear wheel advantageously engages in a gear ring of a control disk, the control disk in turn releasing or locking the movable element directly or indirectly. Here, the gear wheel represents the connecting element between the actuating drive and the control disk. Particular requirements made on the loading of the movable element can be allowed for by means of the control disk.

The hub of the gear wheel advantageously has a stop which releases or locks the movable element as a function of the position of the gear wheel. The hub, which is provided with a stop, can act, directly or indirectly, on a movable element, in particular a locking device of a motor vehicle door, as a result of which a drive device, in particular for a locking device of a motor vehicle door, is realized particularly effectively with a particularly small number of elements.

The actuating drive of the drive device is advantageously an electric motor. It can be a commercially available electric motor, as a result of which the financial expenditure of the drive device is particularly small.

The advantages achieved with the invention lie in particular in the fact that the drive device has a particularly small overall height, which recommends it in particular as the drive for a locking device of a motor vehicle door. At the same time, it is possible here to ensure particularly low wear of the drive device, as long as the elastic intermediate element is made from material which withstands loading for a prolonged time.

BRIEF DESCRIPTION OF THE SEVERAL VIEWS OF THE DRAWINGS

An exemplary embodiment of the invention is explained in greater detail using a drawing, in which.

DETAILED DESCRIPTION OF THE INVENTION

Mutually corresponding parts are provided with the same designations in all figures.

Figure 1:
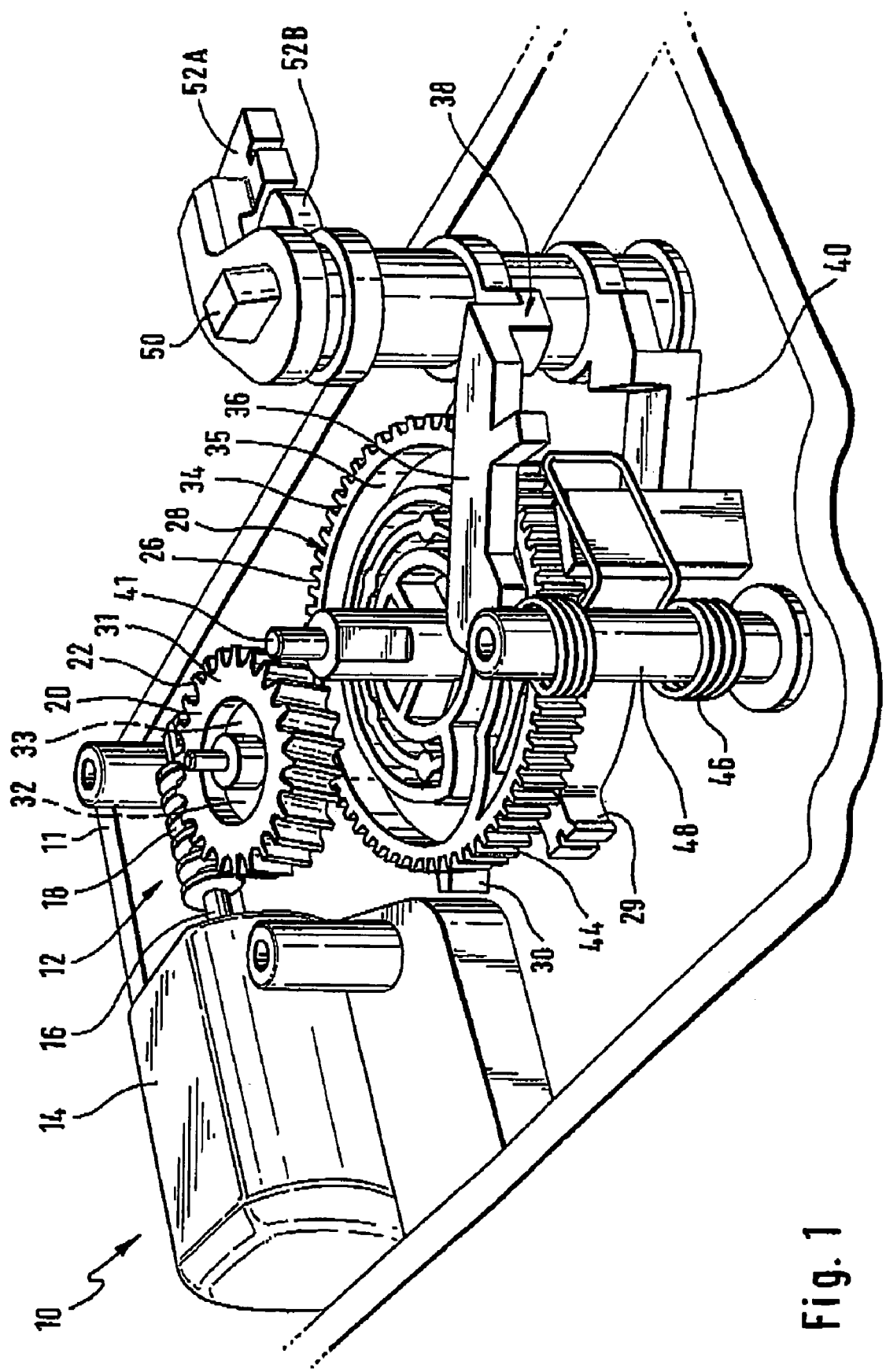
FIG. 1 schematically shows a drive device for a locking device of a motor vehicle door from the side, FIG. 2 schematically shows a drive device for a locking device of a motor vehicle door from the front, and FIG. 3 schematically shows a bottom view of the drive device according to FIGS. 1 and 2.
Figure 2:
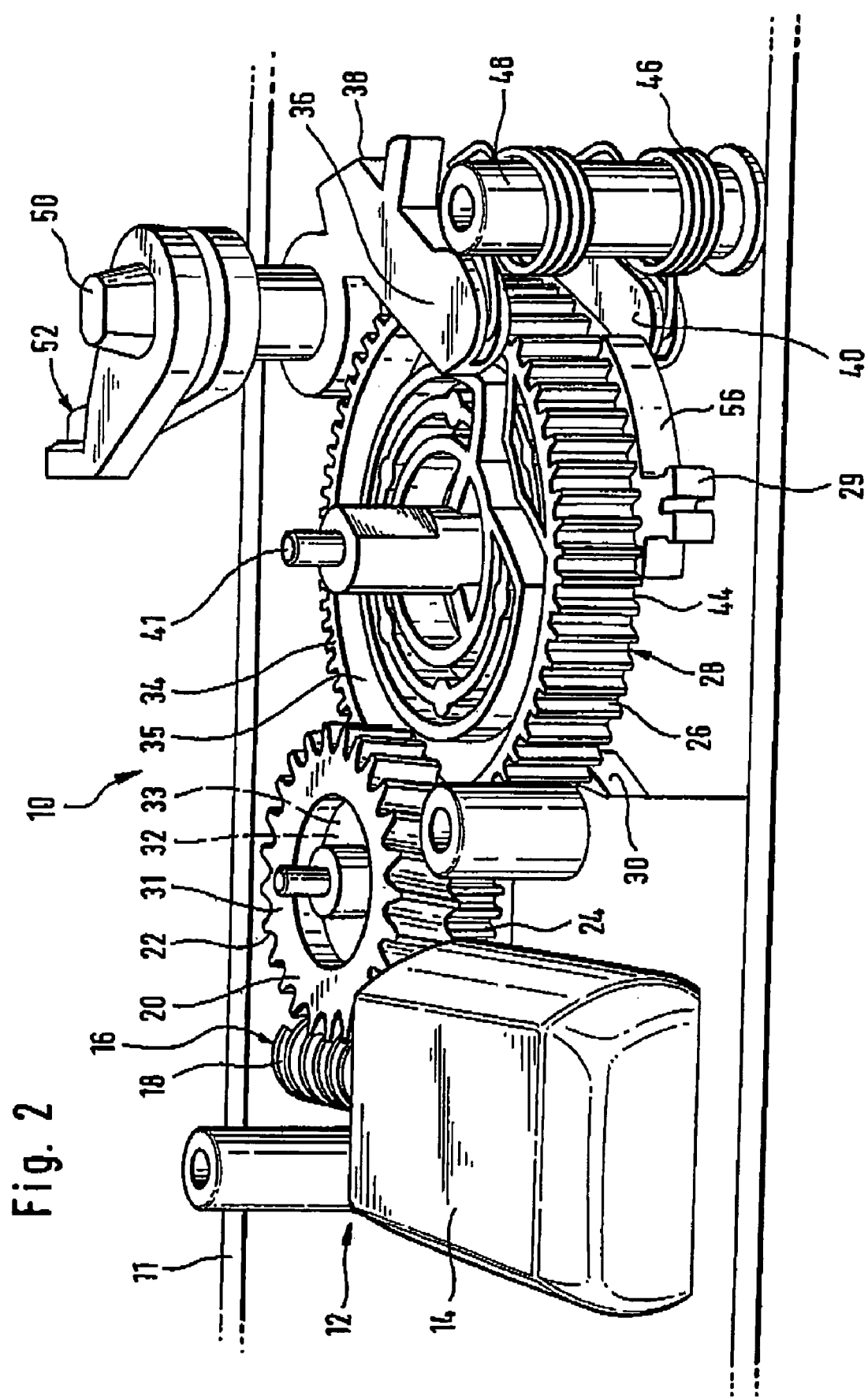

The drive device 10 according to FIGS. 1 and 2 is provided for an electrically operated lock of a door of a motor vehicle. The door and the motor vehicle are not shown in greater detail in the drawing.

The drive device 10 is arranged in a housing 11 and comprises an actuating drive 12, which is a commercially available electric motor. The actuating drive 12 can be supplied with electricity externally (not shown in greater detail in the drawing). The actuating drive 12 has an actuating drive housing 14, from which a shaft 16 protrudes. A worm 18 is arranged on the shaft 16. The shaft 16 and the worm 18 according to the drawing are of one-piece design, as an alternative they can also be of two-piece design, however. The worm 18 meshes a gear wheel 20, which has a gear ring 22 and a hub 24.

The hub 24 of the gear wheel 20 meshes in turn with a gear ring 26 of a control disk 28. This meshing connection takes place below the gear ring 20 and can therefore not be seen in FIGS. 1 and 2. The control disk 28 has a stop 29, by means of which it is possible to set a starting and a rest position of the drive device 10. Furthermore, the stop 29 serves for fixing a position of maximum deflection of the drive device 10 by means of a stop 30 fixed to the housing.

The gear ring 22 of the gear wheel 20 and the hub 24 of the gear wheel 20 are composed of predominantly rigid material 31, which is plastic in this exemplary embodiment. The gear ring 22 of the gear wheel 20 and the hub 24 of the gear wheel 20 are joined to one another by an elastic intermediate element 32. The elastic intermediate element 32 is composed of a predominantly elastic plastic 33. The gear ring 22 of the gear wheel 20 and the hub 24 of the gear wheel 20 are joined to one another with a material-to-material bond by what is known as a two-component technique.

A first arm 36 of a two-armed lever 38 engages in a depression 35, arranged on the upper side 34 of the control disk 28, by means of a lug, which is arranged at the end region of the first arm 36 of the lever 38 so as to extend approximately parallel to the rotational axis 41 of the control disk 28 (not shown in greater detail in the drawing). The depression 35 is configured as an approximately circular channel which extends asymmetrically to the rotational axis 41 of the control disk 28 at least one location. A lug (not shown in greater detail in the drawing) of a second arm 40 of the two-armed lever 38 likewise engages in the underside 44 of the control disk 28. The two arms 36 and 40 of the two-armed lever 38 are prestressed against the control disk 28 by means of a spiral spring 46. The spiral spring 46 is arranged on a projection 48 of the housing 11. The spiral spring 46 is of one-piece design, but it can alternatively also be of two-piece design. The two-armed lever 38 is connected via a shaft 50 to a first movable element 52A and a second movable element 52B which is configured as locking elements for a motor vehicle door.

Figure 3:
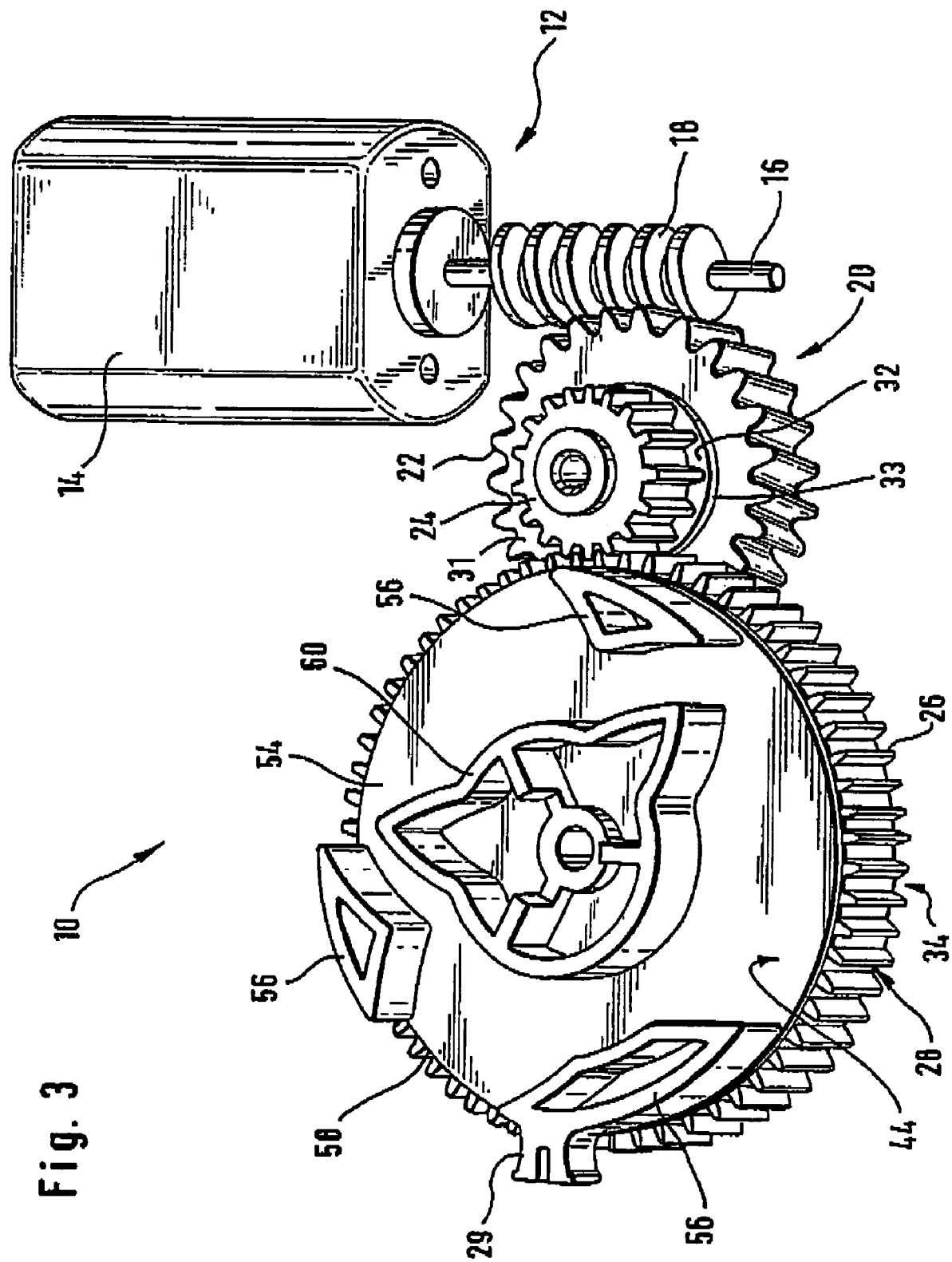

FIG. 3 shows the actuating drive 12, the gear wheel 20 and the control disk 28 from below. It can be clearly seen that the hub 24 of the gear wheel 20 and the gear ring 26 of the gear wheel 20 are joined to one another by the elastic intermediate element 32. FIG. 3 also shows how the hub 24 of the gear wheel 20 meshes the gear ring 26 of the control disk 28. It is also possible to see the stop 29 by means of which it is possible to fix a defined position of the drive device 10 using the stop 30 which is fixed to the housing. Furthermore, FIG. 3 contains a depression 54 which is provided for a lug of the arm 40 of the two-armed lever 38 and designed for a 360 degree rotational movement of the lug. Here, the depression 54 is delimited by three projections 56 at the edge 58 of the control disk 28 and by an elevation 60 extending asymmetrically to the rotational axis 41 of the control disk 28. Alternatively, it is also possible to provide more or less than three projections. Furthermore, it is also possible to configure the depression 54 to be approximately in the shape of a channel.

During the operation of the drive device 10, the actuating drive 12, configured as an electric motor, is supplied with electricity in a manner not shown in greater detail. The shaft 16 of the actuating drive 12 rotates when electricity is supplied. The rotational movement of the shaft 16 is transmitted to the hub 24 of the gear wheel 20 via the worm 18 and the gear ring 22 of the gear wheel 20. The rotational movement of the actuating drive 12 is transmitted in turn from the hub 24 to the control disk 28 via the gear ring 26 of the control disk 28. The rotational movement of the control disk 28 in turn moves the two arms 36 and 40 of the two-armed lever 38 as a function of the position of the respective arm 36 or 40 in the respective depression 35 and 54, respectively.

If the arm 36 is situated in the region of the depression 35 which runs approximately symmetrically to the rotational axis 41 of the control disk 28, then neither the arm 36 nor the movable elements 52A and 52B move. If, however, the arm 36 is situated in the region of the depression 35 which runs asymmetrically to the rotational axis 41 of the control disk 28, then the arm 36 of the two-armed lever 38 is initially deflected in the direction of the rotational axis 41 and then away from the rotational axis 41. This deflection of the arm 36 of the two-armed lever 38 causes, via the shaft 50, an up and down or to and fro movement of the movable elements 52A and 52B. In an analogous manner, the movable elements 52A and 52B are also moved by the second arm 40 of the two-armed lever 38. Here, the two arms 36 and 40 of the two-armed lever 38 can activate the movable elements 52A and 52B in arbitrary combinations, such as simultaneously, sequentially or individually.

In order for it to be possible for the actuating drive 12 to run up in a particularly short time and drive the movable elements 52A and 52B, the actuating drive 12 is of particularly powerful design. The actuating drive 12 can displace the movable elements 52A and 52B in such a way that the stop 29 of the control disk 12 comes into contact with the stop 30. The situation can therefore arise in which the stop 29 of the control disk 28 rests on the stop 30 fixed to the housing and the actuating drive 12 continues to be supplied with electricity. The kinetic energy still present in the drive device 10 on account of the high power of the actuating drive 12, both when the stop 29 of the control disk 28 reaches the stop 30 and when the actuating drive 12 is turned off, is absorbed by the elastic intermediate element 32, which will be described in more detail in the following text.

When the actuating drive 12 is supplied with electricity, the rotational movement of the shaft 16 is transmitted to the gear ring 22 of the gear wheel 20 via the worm 18. The hub 24 of the gear wheel 20 follows the rotational movement of the gear ring 20, as the elastic intermediate element 32 is of sufficiently rigid configuration. The hub 24 of the gear wheel 20 meshes the gear ring 26 of the control disk 28.

After the actuating drive 12 has been supplied with electricity and the stop 29 of the control disk 28 has reached the stop 30, the control disk 28 barely moves any more, as its stop 29 rests on the stop 30 fixed to the housing. However, the actuating drive 12 continues to run and still continues to drive the shaft 16, the worm 18, arranged on the shaft 16 of the actuating drive 12, and the gear ring 22 of the gear wheel 20 in the direction predefined by the actuating drive 12, on account of the fact that the actuating drive 12 continues to run. After the stop 29 of the control disk 28 has reached the stop 30, this movement of the shaft 16 of the actuating drive 12, is transmitted to the gear ring 22 of the gear wheel 20 via the shaft 16 and the worm 18. On account of the elastic properties of the elastic intermediate element 32, the elastic intermediate element 32 now twists without rotating the hub 24 of the gear ring 20 with it. Therefore, a first virtual fixed point on the gear ring 22 of the gear wheel 20 is displaced relative to a second virtual fixed point on the hub 24 of the gear wheel 20. The extent of the displacement is dependent here on the elasticity of the elastic intermediate element 32. Therefore, the second virtual fixed point on the hub 24 of the gear wheel 20 lags behind the first virtual fixed point on the gear ring 22 of the gear wheel 20 in the direction of rotation. The actuating drive 12 is of such dimensions that the actuating drive 12 cannot effect a further rotational movement of the gear wheel 20 given a maximum deflection of the elastic intermediate element 32. Therefore, the twisting of the elastic intermediate element 32 reliably absorbs excess kinetic energy of the actuating drive 12.

Alternatively, the actuating drive 12 can be turned off by a control device (not shown in greater detail) when the stop 29 of the control disk 28 reaches the stop 30. The shaft 16 then comes to rest only after the actuating drive 12 has been switched off. Once the shaft 16 is at a standstill, the elastic intermediate element 32 initially continues to swing in the previous direction. The two virtual fixed points on the gear ring 22 of the gear wheel 20 and on the hub 24 of the gear wheel 20 are arranged approximately opposite one another until the shaft 16 comes to a standstill. Once the shaft 16 is stationary, the first virtual fixed point arranged on the gear ring 22 of the gear wheel 20 overtakes, as it were, the second virtual fixed point arranged on the hub 24 of the gear wheel 20. The extent of the deflection of the first virtual fixed point compared with the second virtual fixed point is dependent here on the elastic properties of the elastic intermediate element 32.

After a point of maximum deflection, defined by the elastic properties of the elastic intermediate element 32, has been reached, the elastic intermediate element 32 then swings back in the opposite direction and once again changes its swing direction as soon as it has reached a further point of maximum deflection. The elastic intermediate element 32 swings to and fro here in a damped manner, as no further energy is supplied to the elastic intermediate element 32. The elastic intermediate element 32 swings until it has reached its position of rest. The elastic intermediate element 32 therefore has the effect of allowing the motion of the control wheel 28 to die away slowly when the actuating drive 12 is turned off. As a result, the rotational movement of the control disk 28 is slowly braked in a damped manner. If the control disk 28 were not braked, the dying-out of the motion of the control disk 28 could cause teeth of the control disk 28, of the hub 24 of the gear wheel 20 and of the gear ring 22 of the gear wheel 20 to be destroyed in an undamped manner on account of the kinetic energy of the actuating drive.

The motion of the elastic intermediate element 32 dies away in a comparable manner if the actuating drive 12 is turned off without the stop 30 of the control disk 28 coming into contact with the stop 30.

The elastic intermediate element 32, which connects the hub 24 of the gear wheel 20 to the gear ring 22 of the gear wheel 20, ensures that, when the actuating drive 12 is turned off, the excess kinetic energy of the actuating drive 12 and the associated peak torque are absorbed by the drive device, without components of the drive device being damaged or, in an extreme case, even destroyed in the process. At the same time, the drive device 10 has a particularly small space requirement which recommends it in particular as the drive of a locking device for a door of a motor vehicle.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

I claim:

1. An electronically driven locking device for electronically engaging and disengaging a locking element of a motor vehicle, wherein the locking device is coupled to
   actuating means having a motor and a worm gear, said motor arranged to drive said worm gear and generate kinetic energy resulting in application of a torque to said locking device, said locking device comprising:
   a gear wheel comprising a gear ring, a hub, an elastic intermediate element and a central axis upon which the gear ring, hub and elastic intermediate element are arranged,
   wherein each one of said gear ring, hub and elastic intermediate element has a lateral side that is substantially perpendicular to said central axis,
   wherein said gear ring and hub are joined together by said elastic intermediate element and via a material to material bond, so that the intermediate element is sandwiched between a lateral side of the gear ring and a lateral side of the hub,
   wherein said gear ring and hub each comprise circumferential teeth, said gear ring teeth being arranged to engage said worm gear such that force from said worm gear is imparted upon said gear ring; and
   a control disk comprising circumferential teeth arranged to interact with said hub teeth such that rotational force may be exchanged between said control disk and hub, said control disk mechanically linked to said locking element such that said torque is absorbed by said intermediate element.

2. The device according to claim 1, wherein said gear ring and hub comprise a plastic and said intermediate element comprises an elastic plastic.

3. The apparatus device to claim 1, wherein the control disk comprises means for effecting a locking and a releasing of the control disk.

4. The device according to claim 1, wherein said locking element is part of a door lock of said motor vehicle.

5. The device according to claim 1, further comprising at least one arm mechanically coupled to said control disk, said at least one arm facilitating imparting of a drive force on said locking element from said control disk.

6. The device according to claim 5, wherein said at least one arm comprises two arms mechanically linked via a single rotatable shaft, and said two arms are spring biased to said control disk.

7. The device according to claim 6, wherein said control disk comprises a plurality of tracks, and said two arms further comprise end extensions engaging said tracks.

8. The device according to claim 7, wherein two of said plurality of tracks are located on opposite sides of said control disk.

9. The device according to claim 1, further comprises a first and a second stop element, said first stop element located at a circumferential location of said control disk and said second stop element located in a path of movement of said first stop element so as to engage said first stop element, wherein when said first stop and second stop elements engage on another said control disk is halted in a direction of said path of movement.

10. The drive element according to claim 1, wherein said torque comprises kinetic energy with said device after deactivation of said motor.

* * * * *